July 28, 1942.    W. N. KELLOGG ET AL    2,291,475
AIRPLANE MULTIPLE CONTROL RECORDER
Filed June 27, 1940    3 Sheets-Sheet 2
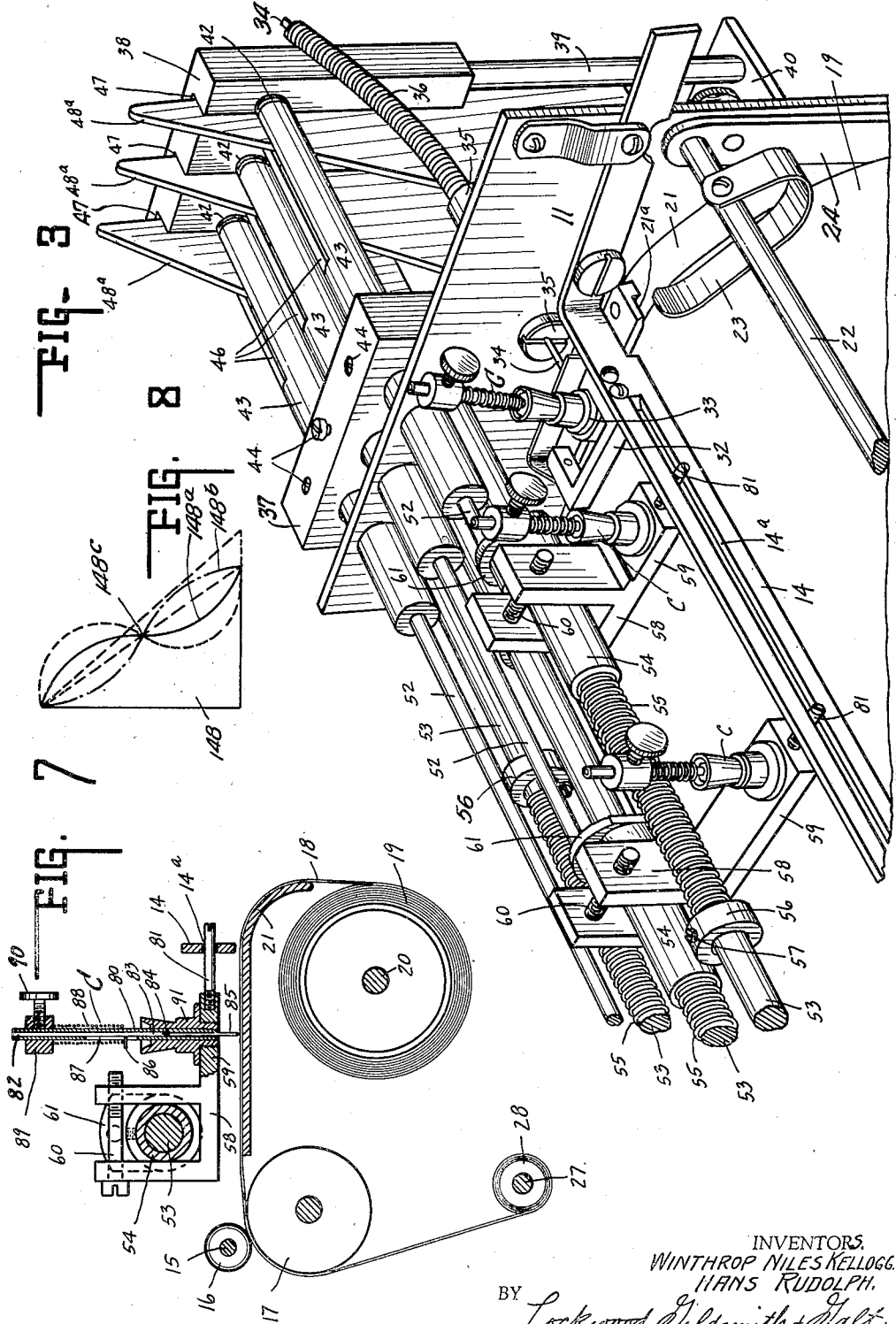
INVENTORS.
WINTHROP NILES KELLOGG.
HANS RUDOLPH.
BY Lockwood, Goldsmith & Galt
ATTORNEYS.

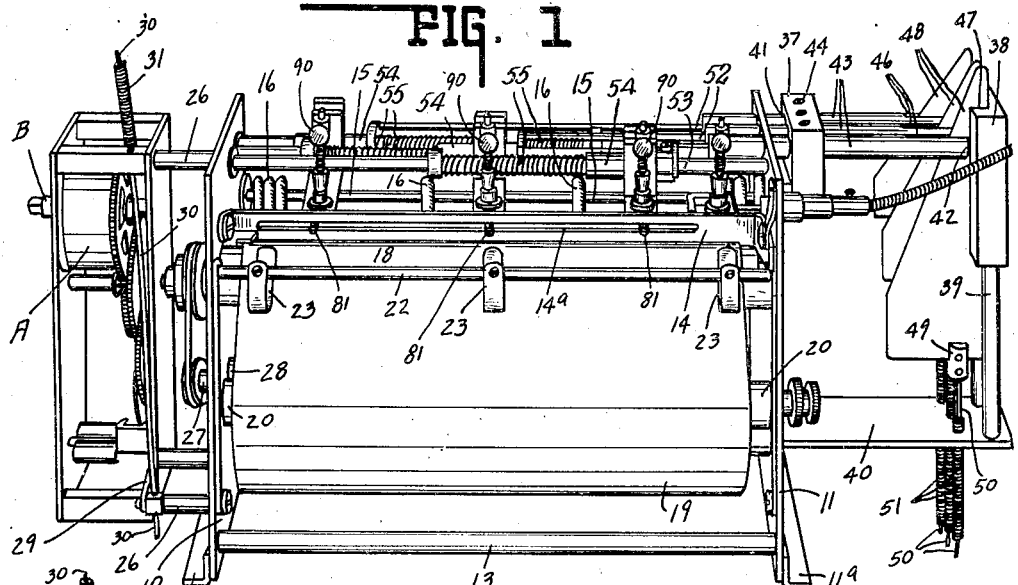

July 28, 1942.   W. N. KELLOGG ET AL   2,291,475
AIRPLANE MULTIPLE CONTROL RECORDER
Filed June 27, 1940   3 Sheets-Sheet 3
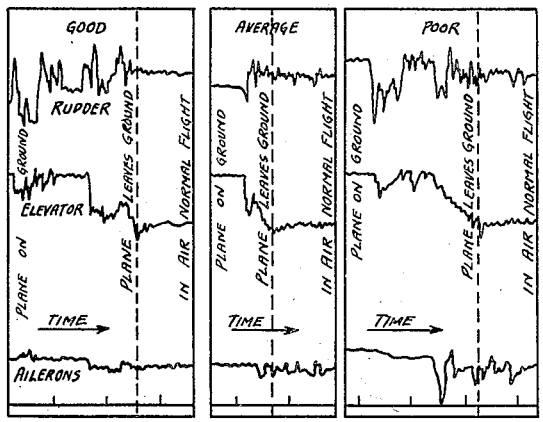
MOVEMENTS OF AIRPLANE CONTROLS DURING TAKE-OFFS.
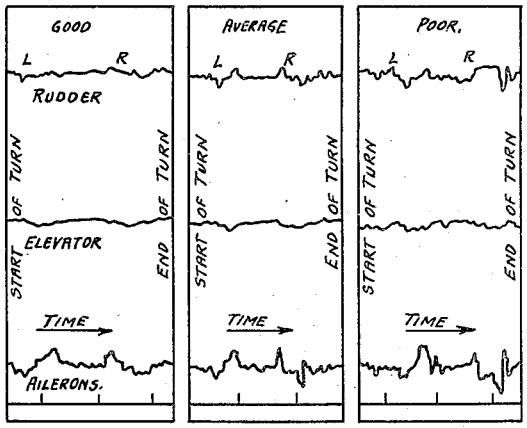
MOVEMENTS OF AIRPLANE CONTROLS DURING TURNS.
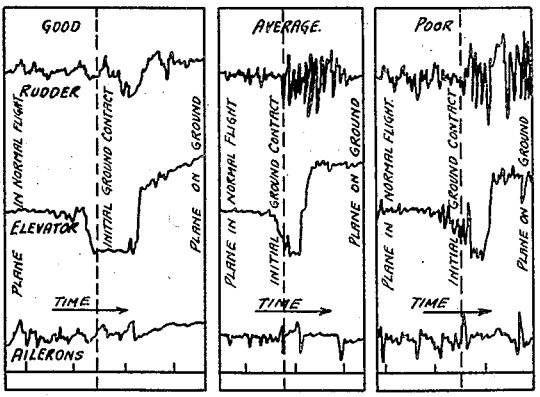
MOVEMENTS OF AIRPLANE CONTROLS DURING LANDINGS.
INVENTORS.
WINTHROP NILES KELLOGG.
HANS RUDOLPH.
BY Lockwood, Goldsmith & Galt
ATTORNEYS.

Patented July 28, 1942

2,291,475

UNITED STATES PATENT OFFICE 2,291,475

AIRPLANE MULTIPLE CONTROL RECORDER

Winthrop Niles Kellogg and Hans Rudolph, Bloomington, Ind., assignors to Indiana University Foundation, Inc., Bloomington, Ind., a corporation Application June 27, 1940, Serial No. 342,620

2 Claims. (Cl. 234—71)

This invention relates to a pilot-response recorder.

The chief object of this invention is to obtain a permanent record of the control of an airplane by a student or pilot during training or examination exercise or problem.

The chief feature of this invention is to provide a permanent recording device with a plurality of recording elements, such as pens or pencils, each of which is responsive to a particular control of an airplane.

An airplane is maneuvered by controlling the rudder, the elevator and the ailerons. When these are neutrally positioned and there are no other factors involved, the airplane will fly a straight line, horizontal course. For take-off, landing, banking and turning, these elements are operated from their neutral positions the desired amount to effect the desired purpose or action of the airplane.

The actual maximum amount of permissible control in opposite directions relative to the neutral position may and usually does vary for each type of control.

One feature of the present invention is to translate the respective actual amounts of control imposed to a "working" range and by a direct proportioning arrangement.

Another feature of the present invention is to simultaneously record all movements of the controls so that for any given instant all the controls imposed upon the plane are recorded.

A further feature of the invention is to provide a manual control for the power device employed to move the record member to start and stop the movement thereof.

A further feature of the invention is to provide a manually operable indicator which the instructor or examiner can operate to designate on the record member the start and finish of the problem or examination, or any unusual control occurrence.

Other objects and features will be set forth more fully hereinafter.

The full nature of the invention will be understood from the accompanying drawings and the following description and claims:

In the drawings,

Fig. 1 is a side view, slightly in perspective, of a clock power embodiment of the invention and detached from the airplane.

Fig. 2 is a perspective view of the embodiment shown in Fig. 1 but on a slightly larger scale.

Fig. 3 is a perspective view, looking down on the proportioning end of the embodiment.

Figs. 4, 5 and 6 are similar views of comparative records including "good," "average" and "poor" controls of an airplane during take-off, turns and landings, respectively, each figure for each airplane movement illustrating the controls imposed upon the three controlling elements of the airplane.

Fig. 7 is a diagrammatic sectional view through a recording device as well as showing the relative positions of the supply, pressure and rewind rolls together with the platen, et cetera.

Fig. 8 is an elevational view of a sinusoidal faced cam, dash lines indicating a reverse form or reverse sine face modification thereof.

In Figs. 1 to 3 of the drawings, 10 indicates one side plate and 11 an opposite plate, each provided with angularly projecting ends 10a and 11a, respectively, suitably secured thereto and in the form of angles and by which the device may be mounted in a suitable position in the cockpit of the airplane. The device is so arranged it may be positioned, if desired, in the tail portion of the fuselage inasmuch as the controls are of the remote operable type. The two plates 10 and 11 are connected by the spacing members 13, 14 and 15, and a spacing member opposite spacing member 13, not shown in the figures.

The spacing member 15, see Figs. 1, 2 and 7, has frictionally mounted thereon a plurality of small rubber wheels 16 which are adapted to bear upon a relatively large roller 17 shown only in Fig. 7. The paper strip 18 passes between roller 17 and wheels 16 and is derived from the supply roll portion 19, see Figs. 1, 2 and 7, suitably mounted as at 20. The strip 18 passes over the platen or plate portion 21, see Fig. 7, having the groove arrangement 21a, see Fig. 3, at each end to receive the side edge of paper 18. The paper 18 passes beneath the cross member 14, the latter being slotted longitudinally at 14a for a purpose hereinafter set forth.

Whenever it is desired to apply tension to the roll 19 which is the supply roll, there may be provided the crossbar 22 which mounts spring fingers 23 and same may be adjustably secured on said member 22, if desired. The opposite ends of the member 22 are carried by the arms 24 pivoted at 25 and by moving these arms toward and away from the axis of the roll 19, the pressure of the spring fingers 23 on the roll will be increased or decreased accordingly.

A clock mechanism indicated generally by the letter A in Fig. 1, is preferably of the key-wound type, the spring of which is wound by means of the key B. This clock mechanism A is supported by the plate 10 by means of the spacing structures 26. The power therefrom is transmitted by the shaft 27 to the rewind roll structure 28. The power is uniformly applied so the rewind roll has substantially uniform rotation and thus the paper strip 18 is passed from the supply roll 19 to the rewind roll 17 over the platen 21 and in the groove or beneath the ledges 21a and beneath the crossbar 14 and bears upon the roller 17 and passes beneath the shaft 15 and the rubber friction wheels 16 thereon.

A member 29, see lower left-hand portion of Fig. 1, is connected by a wire 30 enclosed within a flexible cable portion 31, the two constituting a Bowden wire and the wire terminates in a knob or other manually operable member positioned so as to be conveniently available to the instructor or examiner when riding in the airplane. This knob, etc., is omitted for clearness. The mechanism for starting and stopping the clock movement, and, therefore, the tape or strip movement, may be of conventional character and reference thereto will be had hereinafter. This wire 30 constitutes the master control of the device and starts and stops the operation thereof through the member 29 and said mechanism insofar as accurate recording is concerned. The lower end of member 30 projects beyond member 29 to which it is adjustably secured.

The crossbar 14—see Fig. 3—carries a support 32 and slidably mounted thereon for lateral movement parallel to the crossbar 14 is the base structure 33 and to the same is connected a wire 34 that extends through the tubular element 35 mounted in the side plate 11. This tubular structure 35 has secured to it the flexible cable 36 so that the wire 34 extended therethrough and cable 36 constitute another Bowden wire structure that terminates adjacent the termination of the Bowden wire structure 30—31, previously described, and for a like purpose, to-wit, for instructor or examiner operation. The sole purpose of this control is to indicate on the tape the starting or the stopping instant of the problem or test.

The structure for indicating the latter on the tape 18 includes a pencil arrangement, indicated generally by the letter C, and it is to be understood the lead carrying portion thereof is normally constrained into tape or sheet contact. The writer structure C associated with the wire 34 and base 33, therefore, normally draws a straight line at one side of the chart paper, which line constitutes a base or time line common to all recorders or writers hereinafter to be described. Whenever the Bowden wire 34 is operated, the writer C is caused to move away from the plate 11 and toward the plate 10 a slight amount and this is indicated on the chart paper therebeneath as a departure from that straight line. At the conclusion of the test or the problem, the second actuation of the Bowden wire 34 in conduit 36 provides another transverse mark on the tape. In place of the pencil structure referred to, an inking pen structure may be employed equally as well. Since there are included in the invention three additional pencil structures, reference will be had for the detailed description thereof to that set forth hereinafter.

Carried by the plate 11 is a block 37 and spaced therefrom is a block 38, the latter being suitably supported by the standards 39 carried by an angle plate 40 in turn carried by the lower portion of the plate 11, see Fig. 2. The blocks 37 and 38 are suitably apertured as at 41 and 42, respectively, and extending through the blocks and the plate 11 are the several tubes 43. These tubes are of equal length. These tubes are each secured against relative rotation by suitable means 44, as shown. The outer ends of these tubes are closed as at 45. Each of the tubes is provided with an elongated longitudinal slot 46 that extends from the block 38 toward the block 37. The block 38 also is vertically grooved as at 47 and these grooves register with the slots 46. Slidable in each of these grooves is a triangularly shaped cam 48. Herein the three cams 48 are shown each having a different angularity.

The reason for these different angles is as follows:

The airplane is provided with three controls, as before described, and the actual amount of control movement exercised or possible, for each of these controls is different. The control to the rear in the three figures represents the rudder control. The intermediate control in the three figures represents the elevator control. The forward control represents the aileron controls.

To each of the lower ends of these cam plates there is mounted a clamping fixture 49 and this clamping fixture clampingly mounts a wire 50, the latter being slidable through the coil tube 51. This constitutes a Bowden wire structure. The opposite end of the wire 50 is conected to the control mechanism proper or to that part of the airplane controlled by the aforesaid control, so that the amount of control movement by the ailerons, elevator or rudder, respectively, is, through the wire 50, transmitted to the cam 48 connected to that wire and the cam 48 is raised or lowered from the neutral position an amount equal to the amount of control movement exercised on the airplane control or controlled element. It will be observed, see Fig. 1, that the rearward plate 48 or rudder control plate is relatively short and has a relatively larger included angle between its block groove receivable edge and its upper inclined edge than the elevator cam plate and the latter has a similarly larger angle than the angle of the aileron control cam plate.

Mounted within each of the tubes 46 and slidable therein is a rod structure 52. These rods are of different lengths for reasons hereinafter to be set forth. Positioned beneath each of the several tubes 43 and extending from plate 11 to plate 10 and suitably secured thereto are the guide rods 53 parallel to rods 52. A sleeve 54 is slidable on each guide rod. It is normally constrained by spring 55 bearing on the end of the sleeve 54 and in two instances that end remote from the plate 11. The opposite end of the spring 55 is retained by an adjustable collar 56 adjustably secured to the rod 53 as at 57.

Rigid with each sleeve 54, see particularly Fig. 7, is a bracket structure 58 which has a projecting portion 59 that mounts one of the pencil or pen structures indicated by the letter C. This bracket structure may be shifted longitudinally along said sleeve 54 and may be tilted slightly in angular relation to the axis of the sleeve. The bracket is secured as at 60 in the said adjusted position.

Rigid with the sleeve 54 is a plate portion 61 and the rod 52 may be rigid therewith. Hence, by reason of the spring 55 the rod 52 is always constrained toward the right in the several figures and thus is constrained into engagement with the inclined edge 48a of the cam member 48. If desired, this rod 52 adjacent cam 48 may have an inclined edge complementarily formed for such engagement.

It will be apparent, therefore, that the three rods 52 have like movement incident to individual cam reciprocation and, therefore, the bracket 58 will have corresponding movement, and consequently, the pen or indicator C carried by the respective bracket will have movement transverse to the movement of the sheet, tape or strip 18.

It also will be noted the lengths of the three rods 52 are dissimilar for this purpose. If there is an available width of tape of say 7" and the ½" or so immediately adjacent the plate 11 is reserved for problem starting and stopping indication, the remaining 6½" may be divided as follows:

The opposite side to an extent of ½" or so is not utilized for recording or it may have time indicia intervals printed thereon. The intervening 6", since there are three indicators, or recorders provided, would have each a possible range of indication on the tape or strip of 2". Consequently, when the cams are positioned in neutral position, the bracket 58 of the aileron indicator or recorder would be positioned about 1½" to 1¾" from the edge of the sheet 18 closest to plate 11. The elevator indicator or recorder supporting bracket 58 would be positioned 2" therefrom and 2" beyond the same would be positioned rudder indicator or recorder supporting bracket 58, reference being had to pen C carried by each bracket.

Thus, the area of the tape transverse to its longitudinal length or feeding direction may be properly divided so that each recorder has an equal increment or interval available for recording purposes. As the cam is elevated or lowered from the neutral position, the corresponding recorder or indicator is moved toward the left or right, respectively, from the neutral position to indicate the departure from that neutral position required for the control of the airplane under the given problem or conditions. Briefly, the sequence of operation is as follows:

Assuming the recording device being properly installed and properly connected and assuming further the main spring of the clock mechanism has been properly wound, if a record is desired for take-off after the engine has been properly warmed up and the take-off is to be attempted, the examiner or instructor operates the Bowden wire 30 to start tape feeding. When the student or person being examined then takes over the controls for the purpose of taking off after having previously tried all controls to see that they are free and properly working, the instructor operates the Bowden wire 34 which places a mark upon the tape, which is now feeding.

The student or examiner in taking off the airplane actuates the necessary airplane controls and to the degree deemed necessary.

This actuation, and the amount of same is translated by Bowden wires 50 to the corresponding cams 48. Each cam translates that particular control movement into linear movement of the corresponding ruling pen or pencil transverse to the direction of tape feeding. Thus a permanent simultaneous record is obtained of take-off controls. If that is the only problem, at the conclusion of the take-off, the instructor or examiner will again operate the Bowden wire 34 to indicate the conclusion of that problem and then also operates the Bowden wire 30 to stop tape feeding.

Fig. 4 shows three permanent records of this particular problem. The one at the left shows a good take-off. This probably is one made by an instructor or examiner pilot. The middle group of records in Fig. 4 will be the record obtained from an average pilot or one that is a satisfactory pilot. The three groups illustrated in the right hand portion of Fig. 4 illustrate the control exercised by what would be termed a poor pilot, resulting in a poor take-off. The vertical dotted line in each of the three portions of the figure indicates the instant that the airplane has left the ground.

In Fig. 5 there is illustrated a similar set of records relating to the control of an airplane in making a left (L) and right (R) turn.

In Fig. 6 there is illustrated a similar set of records of the control of an airplane in a landing problem. The vertical dotted lines in each of the three portions of this figure indicate the instant the airplane has touched the ground on its first contact therewith. It is noted that these three charts do not disclose the indication thereon which is made by the problem start and stop pen or pencil carried by the members 32—33. The graduation marks on the bottom of the charts, Figs. 4, 5 and 6, are time interval marks printed on the sheet.

A complete flight record, it is obvious, could be made equally as well. The rate of tape feeding is approximately three inches per minute or one-quarter inch per five seconds and the roll 19 is approximately 400 feet or 1,600 minutes flying time recording capacity. This is more than a full day.

It is to be observed that the angle of the cam face 48a is preferably made such that the maximum range of possible control movement of the airplane control may be applied to the available interval or increment of the chart.

It also is to be observed and as comprehended within the scope of this invention, that the cam face 48a for certain purposes, need not necessarily be a straight or plane face but, for example, it might be of sinusoidal character, the inclined face of the present cam being the zero coordinate and the zero point of the sine curve registering with the neutral point of the present cam. In this way an actual record may be obtained for other purposes whenever it is required that movement of the airplane control be thus translated through the desired modifier. Such a modifier is shown in Fig. 8 wherein 148 indicates a sinusoidal cam having modifying face 148a of sine type. It may have a reverse sine face 148b shown by dash lines. The neutral point of the airplane control would occur at 148c in either case.

Broadly, therefore, the present invention contemplates a continuously and uniformly moving tape or strip to which is applied one or more marker devices, the same having movement transversely of the direction of tape movement, the tape being manually controlled for starting and stopping thereof, together with, if, as and when desired, the addition of a problem starting and stopping marker. The two last mentioned are manually controlled as by an instructor and the other marker, or markers, are automatically controlled and responsive to the manual operation of the variable mechanism, or mechanisms, a record of the operation of which it is desired to be obtained.

In Fig. 7 there is illustrated one form of pencil marker, indicated in Figs. 1 to 3 by the letter C and also the several associated parts. It will be noted that the strip 18 passes from the supply roll 19 mounted on shaft or mounting 20 over the platen portion 21 and thence feeds over the roll 17 being held thereon by the friction wheels 16 mounted on shaft 15 and the tape then winds upon the roll 26 previously described and carried by the shaft 27 driven by the chain 27a, see Fig. 1, in turn driven by the clock mechanism and controlled by wire 30.

It will be remembered the rod 53 mounts the sleeve 54 which at one end has an ear 61 to which is secured or against which abuts the reciprocating rod 52 slidable in the tube 43, the other end of that rod having operative engagement with the face 48a of the cam member 48 and within the slot 46.

It also will be remembered the spring 55 bearing at one end on the adjustable collar 56 normally constrains the sleeve 54 so that the rod 52 does maintain that cam engagement. As shown in Fig. 3, the foremost and intermediate sleeves are constrained by extension springs which normally tend to elongate. Due to the fact that the member 58 of the rearmost sleeve structure is relatively close to the plate 10—see Figs. 1 and 2, the spring 55 in this rearmost unitary arrangement is a tension spring or one that normally tends to contract. The reason for utilizing this type of spring here is because the plate 10 is too close to the sleeve to permit use of the other type of spring.

In Fig. 7 the bracket 58 having the extension 59 slidably supports a pencil carrier arrangement 80. This carrier is locked in adjusted, vertical position by means of the threaded member 81. The latter is extended and the free end thereon rides in the slot 14a of the member 14. This insures proper sliding of the sleeve on rod 53 by reason of movement of rod 52. In other words, member 81 in slot 14a, prevents vertical turning movement and horizontal turning movement and thus prevents binding of the sleeve 54 when sliding on the rod 53.

The member 80 is tubular and in the bore 82 thereof there is slidably supported the member 83, the latter terminating in a lead holder portion 84 retaining lead 85 therein. The member 83 includes an outwardly directed pin 86 that extends through an elongated slot 87 in the member 80. About the member 80 and bearing on the pin 86 is an extension spring 88, the upper end of which bears on the collar 89 adjustably clamped as at 90 to the tube 80. Thus, the lead or pencil is always constrained by spring 88 into sheet engagement for marking purposes. The construction is so arranged that in place of the pencil there may be substituted a standard stylus type pen which will form an ink mark on the sheet or tape 18 whenever desired.

The term "record sheet" in the claims is intended to include recording paper or chart paper of strip or tape type and linearly movable as well as of disc type and rotatable.

The term "marking member" forming a line record on such record sheet is intended to include a conventional pencil, ink writer or stylus, and in the latter instance the sheet may be surface coated as by lampblack or paraffin and the stylus makes its record thereon.

In view of the known inherent error introduced in arc indication, the form of the invention selected for illustration, description and exemplification has been of linear indicating type. In this type all record lines are permanently synchronized and have no error introduced thereon.

Furthermore, while the example has been described as applied to airplane control recording, the invention may be otherwise applied without departing from the basic disclosure of the invention.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In combination, an elongated support, a marking member slidably supported thereby, means normally constraining said member to one position, and other means operatively associated with the marking member for moving same in opposition to the constraining means, said other means including a member reciprocable parallel to the support, cam means linearly reciprocable in a plane including the last mentioned reciprocable member, and support means for the last mentioned reciprocable member including a slotted tube, the slotting being longitudinally directed to slidably receive the cam means, the reciprocable member being longitudinally slidable in the tube and projecting beyond the same opposite the cam engaging end for connection to the marking member.

2. In combination, an elongated support, a marking member slidably supported thereby, means normally constraining said member to one position, and other means operatively associated with the marking member for moving same in opposition to the constraining means, said other means including a member reciprocable parallel to the support, cam means linearly reciprocable in a plane including the last mentioned reciprocable member, and support means for the last mentioned reciprocable member including a slotted tube, the slotting being longitudinally directed to slidably receive the cam means, the reciprocable member being longitudinally slidable in the tube and projecting beyond the same opposite the cam engaging end for connection to the marking member, and a grooved stationary support for the cam means and confronting said reciprocable member, the cam means being interposed therebetween and slidable in the support groove, the slotted tube having rigid connection with the grooved support.

WINTHROP NILES KELLOGG.
HANS RUDOLPH.